United States Patent [19]

Kagata et al.

[11] Patent Number: 5,219,808
[45] Date of Patent: Jun. 15, 1993

[54] DIELECTRIC CERAMIC COMPOSITION

[75] Inventors: Hiroshi Kagata; Junichi Kato; Keiji Nishimoto, all of Osaka, Japan

[73] Assignee: Matsushita Electric Industrial Co., Ltd., Osaka, Japan

[21] Appl. No.: 913,203

[22] Filed: Jul. 15, 1992

[30] Foreign Application Priority Data

Jul. 16, 1991 [JP] Japan .................................. 3-175090
Nov. 11, 1991 [JP] Japan .................................. 3-294643

[51] Int. Cl.$^5$ ............................................. C04B 35/00
[52] U.S. Cl. ..................................... 501/135; 501/126
[58] Field of Search .............................. 501/135, 126

[56] References Cited

U.S. PATENT DOCUMENTS

| 4,216,102 | 8/1980 | Furukawa et al. | 501/135 |
| 4,216,103 | 8/1980 | Fujiwara et al. | 501/135 |
| 4,330,631 | 5/1982 | Kawashima et al. | 501/139 |

FOREIGN PATENT DOCUMENTS

| 0121957 | 9/1980 | Japan | 501/135 |
| 0139100 | 10/1980 | Japan | 501/135 |
| 0154004 | 12/1980 | Japan | 501/135 |

OTHER PUBLICATIONS

Wakino et al., *Microwave Characteristics of (Zr, Sn)TiO$_4$ and BaO-PbO-Nd$_2$O$_3$-TiO$_2$ Dielectric Resonators*, Journal of the American Ceramic Society, JACTAW, vol. 67, No. 4, pp. 278-281 (Apr. 1984).

*Primary Examiner*—Mark L. Bell
*Assistant Examiner*—Deborah Jones
*Attorney, Agent, or Firm*—Willian Brinks Olds Hofer Gilson & Lione

[57] ABSTRACT

The present invention provides a composition of dielectric ceramic composition to be used in the frequency region of microwaves.

The composition contains lead oxide, calcium oxide, iron, oxide, tantalum oxide and niobium oxide, and is represented by $(Pb_{1-x}Ca_x)_{1+a}\{Fe_{1/78}(Ta_{1-y}Nb_y)_{1/78}\}O_{3+a}$ wherein x, y and a satisfy, respectively, $0.44 \leq x \leq 0.63$, $0.0 \leq y \leq 1.0$ and $0.0 \leq a \leq 0.08$.

1 Claim, No Drawings ically 80 dielectric constant, and as high as about 3000
Q factor at 2-4 GHz, and a small temperature coefficient of the resonant frequency. Also, Ba-PbO-TiO2-Nd2O3 type has been reported in the Journal of American Ceramic Society, Vol. 67 (1984), p. 278-281 as a ceramic composition having a dielectric constant of not smaller than 90.

Not only the above-described types of ceramic compositions, but the conventional ceramic compositions of a high dielectric constant for microwave use have a high sintering temperature, namely, 1300° C. or so and are of mixed phase. Therefore, the microwave characteristics of the mass-produced ceramic composition are greatly varied and, manufacturing costs high.

DIELECTRIC CERAMIC COMPOSITION

BACKGROUND OF THE INVENTION

1. Field of the Invention

The present invention relates to a dielectric ceramic composition to be used in the frequency region of microwaves.

2. Description of the Prior Art

As the communications method utilizing electromagnetic waves in the frequency region of microwaves has been progressed in past years, for example, in the automobile telephones, portable phones or satellite communications, etc., miniaturization of the apparatus is strongly required. That is, miniaturization of each components constituting the apparatus is demanded. A dielectric material is incorporated in a filter or an oscillator of the apparatus as a dielectric resonator. The size of the dielectric resonator is inversely proportional to a square root of the dielectric constant of the dielectric material when same resonant mode is used, and therefore a dielectric material with a high dielectric constant becomes necessary in order to a compact size dielectric resonator is realized. Besides, the loss of the dielectric material against microwaves should be small, i.e., the dielectric material should have a high Q factor, with a small temperature change of the resonant frequency so that the dielectric material is applied to an actual resonator.

Many ceramic compositions have ever been developed for use in the dielectric resonator. In these compositions BAO-TiOO2-SM2O3 type has been disclosed as a ceramic compositions of a particularly high dielectric constant in U.S. Pat. No. 4,330,631 dated May 18, 1982. This type of ceramic compositions assumes approximately 80 dielectric constant, and as high as about 3000 Q factor at 2-4 GHz, and a small temperature coefficient of the resonant frequency. Also, Ba-PbO-TiO2-Nd2O3 type has been reported in the Journal of American Ceramic Society, Vol. 67 (1984), p. 278-281 as a ceramic composition having a dielectric constant of not smaller than 90.

SUMMARY OF THE INVENTION

The object of the present invention is therefore to provide a composition of ceramic composition having approximately the same high dielectric constant as the conventional microwave ceramic composition and a low sintering temperature.

In order to accomplish the above-described object, according to the present invention, a novel ceramic composition is provided, which is composed of lead oxide, calcium oxide, iron oxide, tantalum oxide and niobium oxide, and represented by $(Pb_{1-x}Ca_x)_{1+a}\{(Fe_{\frac{1}{2}}(Ta_{1-y}Nb_y)_{\frac{1}{2}})\}_{3+a}$ wherein x, y and a respectively satisfy:

$0.44 \leq x \leq 0.63$ $0.0 \leq y \leq 1.0$ $0.0 \leq a \leq 0.08$

The sintering temperature of the ceramic composition is 1150° C. or lower. Moreover, the ceramic composition has not smaller than 40 dielectric constant and not smaller than 500 Q factor in the 2-6 GHz microwave frequency, with not larger than 100 ppm/° C. absolute value of the temperature coefficient of the resonant frequency. (The ceramic composition forms perovskite-type single.)

DETAILED DESCRIPTION OF THE PREFERRED EMBODIMENT

As a starting material of a ceramic composition of the present invention, PbO, CaCO3, Fe2O3, Ta2O5 and Nb2O5 with a chemically high purity are used. These materials are weighed into a variety of composition after the purity thereof is corrected. Powdered materials are put in a polyethylene ball mill. Balls of stabilized zirconia having 5 mm diameter and pure water are added to the materials and mixed for 17 hours. After the mixing, the slurry is dried, moved into an alumina crucible, and calcined for two hours at 800-950° C. The calcined powder is milled in the ball mill for 17 hours. Thereafter, the slurry is dried thereby to obtain a powder material. 5% solution of polyvinyl alcohol is added as a binder to the powder material by 6 wt. % and granulated through a 32-mesh screen, subsequently pressed with 100 Mpa into the configuration of a cylinder having 13 mm diameter and about 5 mm thickness. After the pressed body is heated for two hours at 600° C. to burn out the binder, the body is placed into a magnesia vessel along with the calcined powders of the same composition so as to prevent evaporation of PbO. The vessel is capped and is sintered for two hours at 1000-1200° C. The dielectric characteristic for the microwaves of the sintered body which has been sintered at the temperature to assume the maximum density is measured. The resonant frequency and Q factor are detected according to a dielectric resonator method. Moreover, the dielectric constant is calculated from the size and resonant frequency of the sintered body. The resonant frequency is 2-6 GHz. The temperature coefficient ($\tau f$) is calculated by the method of least squares after measuring the resonant frequencies at −25° C., 20° C. and 85° C. The results are shown in Table 1 below.

TABLE 1

| No. | Composition x | y | a | S.T. °C. | ε | Q | τf ppm/°C. |
|---|---|---|---|---|---|---|---|
| 1* | 0.42 | 1.0 | 0.0 | 1150 | 152 | 770 | +111 |
| 2* | 0.42 | 0.0 | 0.0 | 1050 | 109 | 410 | +141 |
| 3 | 0.44 | 1.0 | 0.0 | 1150 | 141 | 880 | +91 |
| 4 | 0.44 | 0.0 | 0.0 | 1050 | 95 | 530 | +100 |
| 5 | 0.48 | 1.0 | 0.0 | 1150 | 121 | 1110 | +56 |
| 6 | 0.48 | 0.9 | 0.0 | 1150 | 117 | 1100 | +51 |
| 7 | 0.48 | 0.5 | 0.0 | 1100 | 92 | 870 | +39 |
| 8 | 0.48 | 0.2 | 0.0 | 1100 | 85 | 620 | +35 |
| 9 | 0.48 | 0.0 | 0.0 | 1050 | 77 | 590 | +33 |
| 10* | 0.5 | 1.0 | −0.02 | 1200 | 115 | 210 | +41 |
| 11 | 0.5 | 1.0 | 0.0 | 1150 | 113 | 1230 | +38 |
| 12 | 0.5 | 1.0 | 0.03 | 1100 | 111 | 1200 | +37 |
| 13 | 1.0 | 1.0 | 0.08 | 1100 | 107 | 1020 | +30 |
| 14* | 0.5 | 1.0 | 0.1 | 1050 | 99 | 490 | +23 |
| 15* | 0.5 | 0.0 | −0.02 | 1100 | 62 | 110 | −17 |
| 16 | 0.53 | 0.0 | 0.0 | 1050 | 60 | 670 | −21 |
| 17 | 0.53 | 0.0 | 0.03 | 1050 | 58 | 660 | −22 |
| 18 | 0.53 | 0.0 | 0.08 | 1050 | 55 | 530 | −17 |
| 19* | 0.53 | 0.0 | 0.1 | 1050 | 51 | 330 | −12 |
| 20 | 0.53 | 0.5 | 0.0 | 1100 | 77 | 1000 | +1 |
| 21 | 0.56 | 1.0 | 0.0 | 1150 | 92 | 1450 | +7 |
| 22 | 0.63 | 1.0 | 0.0 | 1150 | 70 | 2090 | −14 |

TABLE 1-continued

| No. | Composition x | y | a | S.T. °C. | $\epsilon$ | Q | $\tau f$ ppm/°C. |
|---|---|---|---|---|---|---|---|
| 23 | 0.63 | 0.5 | 0.0 | 1100 | 55 | 1410 | −36 |
| 24 | 0.63 | 0.0 | 0.0 | 1100 | 40 | 820 | Δ59 |
| 25* | 0.65 | 0.0 | 0.0 | 1100 | 36 | S30 | −72 |

S.T.: sintering temperature

The asterisk refers to a comparative example out of the range of the invention.

As is apparent from Table 1, the ceramic composition in the claimed region results in the characteristics of 40 or higher dielectric constant, 500 or higher Q factor and 100 ppm/° C. or lower absolute value of the temperature coefficient of the resonant frequency.

On the other hand, if x in the composition formula is smaller than 0.44, the dielectric constant becomes higher, but the temperature coefficient of the resonant frequency exceeds 100 ppm/° C. If x in the composition formula becomes larger than 0.63, the dielectric constant is decreased to 40 or lower. Moreover, when a in the composition formula is negative or exceeds 0.08, the Q factor is not larger than 500. Therefore, the ceramic composition outside the claim is not practically useful as a dielectric material for use in the frequency region of microwaves. If y in the composition formula is increased, that is, Ta is substituted with Nb, the dielectric constant and Q factor are raised, but the sintering temperature becomes higher. Particularly, according to the composition No. 21 in Table 1, the dielectric constant is 90 or higher and the Q factor is 1000 or higher, and moreover the absolute value of the temperature coefficient of the resonant frequency shows not larger than 10 ppm/° C. The ceramics of the composition No. 21 has superior microwave dielectric characteristics.

As is made clear from the foregoing description, the dielectric ceramic composition of the present invention is composed of lead oxide, calcium oxide, iron oxide, tantalum oxide and niobium oxide, representing remarkable dielectric characteristics in the frequency region of the microwaves. Especially, the sintering temperature of the ceramic composition is low, specifically, 1150° C. or lower, with forming perovskite-type single phase. Accordingly, the characteristics of the ceramic composition during the mass production can be restrained from varying and the manufacturing cost can be reduced. Further, the dielectric ceramic composition embodied by the present invention is applicable not only to a dielectric resonator, but to a circuit substrate for microwaves. In other words, the dielectric ceramic composition of the present invention is of high practical use in industry.

The ceramic composition may contain oxides of the other elements than within the scope of the invention so long as they do not make adverse effects to the dielectric characteristics of the ceramic composition.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claim unless they depart therefrom.

What is claimed is:

1. A dielectric ceramic composition composed of lead oxide, calcium oxide, iron oxide, tantalum oxide and niobium oxide, and represented by $(Pb_{1-x}Ca_x)_{1+a}\{Fe_{\frac{1}{3}}(Ta_{1-y}Nb_y)_{\frac{2}{3}}\}O_{3+a}$ wherein x, y and a satisfy, respectively, $0.44 \leq x \leq 0.63$, $0.0 \leq y \leq 1.0$ and $0.0 \leq a \leq 0.08$.